Figure 1:
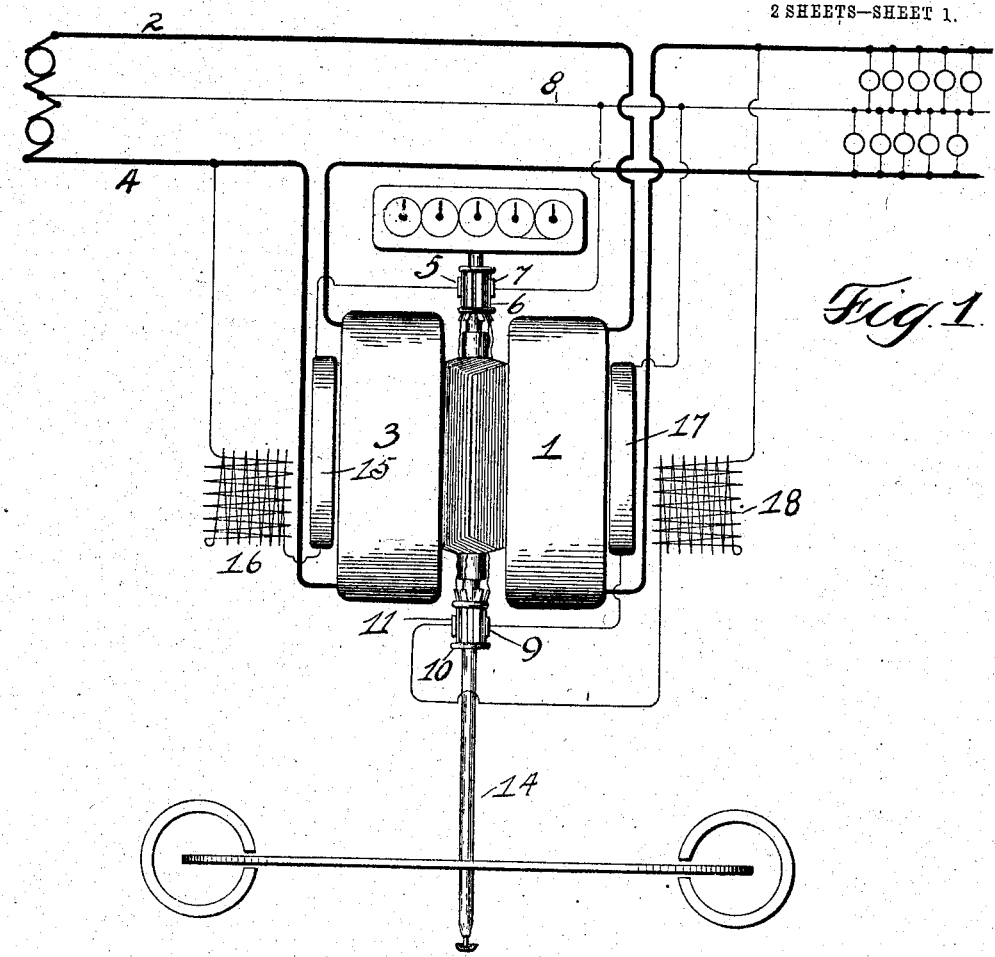

No. 796,070. PATENTED AUG. 1, 1905.
T. DUNCAN.
THREE WIRE METER.
APPLICATION FILED OCT. 10, 1904.

2 SHEETS—SHEET 1.

Witnesses:
A. J. Ostrander
Leon Stroh

Inventor:
Thomas Duncan
By G. L. Cragg Atty

No. 796,070. PATENTED AUG. 1, 1905.
T. DUNCAN.
THREE WIRE METER.
APPLICATION FILED OCT. 10, 1904.

2 SHEETS—SHEET 2.

Witnesses:
A. J. Ostrander
Leon Stroh

Inventor:
Thomas Duncan,
By G. L. Cragg
Attorney

UNITED STATES PATENT OFFICE.

THOMAS DUNCAN, OF LAFAYETTE, INDIANA.

THREE-WIRE METER.

No. 796,070.　　　　Specification of Letters Patent.　　　　Patented Aug. 1, 1905.

Application filed October 10, 1904. Serial No. 227,857.

*To all whom it may concern:*

Be it known that I, THOMAS DUNCAN, a citizen of the United States, residing at Lafayette, in the county of Tippecanoe and State of Indiana, have invented a certain new and useful Improvement in Three-Wire Meters, of which the following is a full, clear, concise, and exact description, reference being had to the accompanying drawings, forming a part of this specification.

My invention relates to wattmeters of the type employed for measuring energy in three-wire systems of electrical distribution.

Hitherto it has been the practice to provide a field-winding in each of the large mains and to connect the pressure-windings directly across these mains. It is very obvious that with this arrangement of the prior art an interruption of either main will open only one side of the system, leaving the other side, comprising the neutral conductor and the remaining main conductor, in circuit with its portion of the source of current-supply. When either main conductor is thus open, the meter is obviously thrown out of service; but this may be immaterial to the consumer, who secures the service of the side of the system remaining intact free.

It is the object of my invention to provide an improved arrangement for the meter whereby it can operate when either or both sides of a three-wire system are in service, so that the consumer may not defraud the company by an intentional interruption of a main conductor.

In accordance with my invention the pressure-winding of the meter is connected with the neutral conductor in such a manner that a portion of each pressure-winding is included in each side of the system, so that each side of the system will have a current-coil and a pressure-coil of the meter in circuit therewith to produce turning effort as a result of the current flowing in the corresponding side of the system.

The invention finds a very useful embodiment in commutated meters, and in adapting the invention to this class of meters the pressure or armature winding is distributed in two sets of armature-coils, each set preferably having a set of commutator-segments, there being also two pairs or sets of brushes, one for one set of armature-coils and the other for the other set of armature-coils. The commutator-segments are preferably aggregated to constitute two distinct commutators, each having a pair of the brushes. One brush of each pair is connected with an outside main conductor, while the other brush of each pair is connected with the neutral conductor to secure the results desired.

I will explain my invention more fully by reference to the accompanying drawings, in which—

Figure 2:
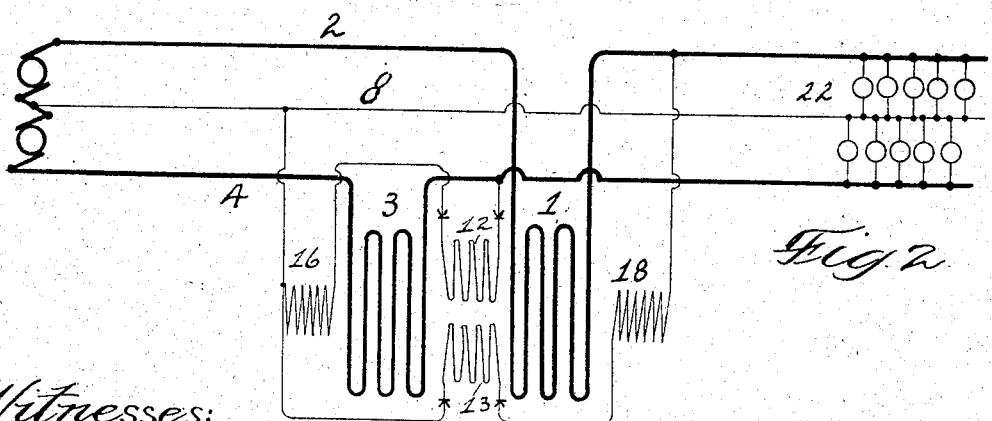
Figure 3:
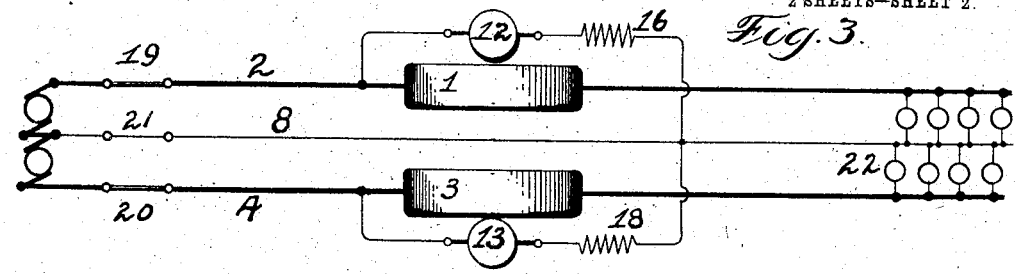
Figure 4:
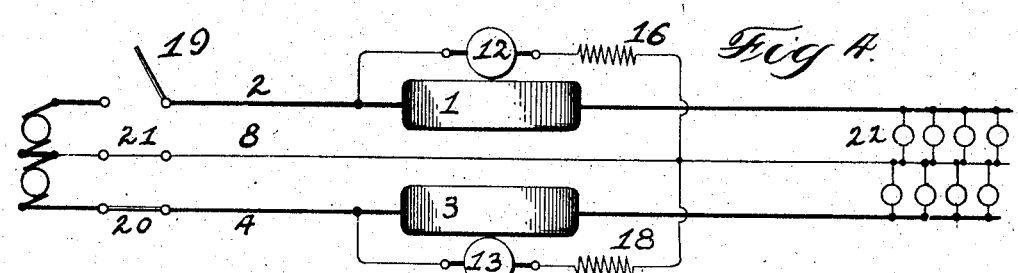
Figure 5:
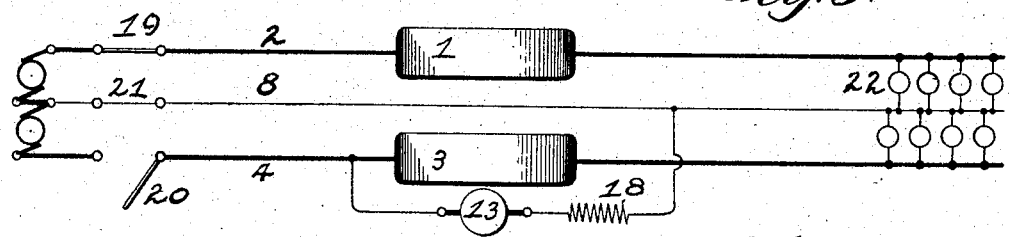
Figure 6:
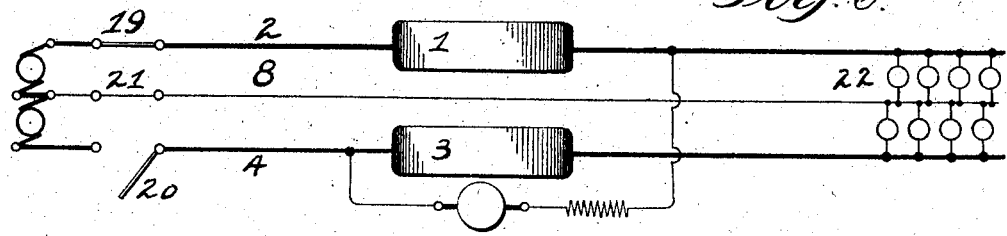
Figure 7:
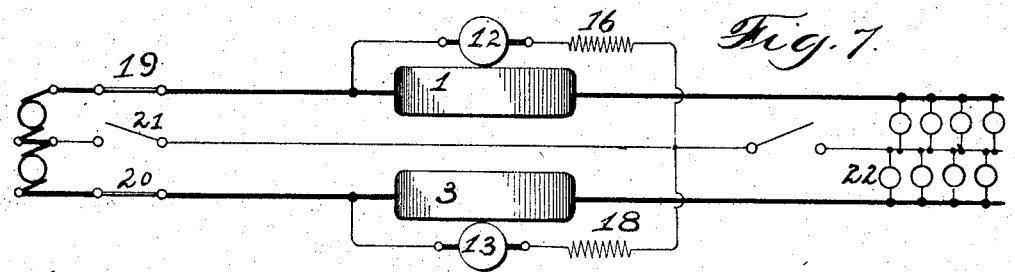

Figure 1 is a diagrammatic view showing the connections of my improved meter in a system of electrical distribution. Fig. 2 is a view somewhat more diagrammatic than Fig. 1, illustrating even more clearly the circuit connections. Fig. 3 is a further diagrammatic view illustrating in a more simplified form the circuit connections, both sides of the system being shown intact. Fig. 4 is a view similar to Fig. 3, illustrating the upper main open at a fuse, the lower side of the system alone remaining intact, but in operative connection with the meter. Fig. 5 shows, diagrammatically, a connection of the meter as in the prior art, showing how the purpose of the meter is defeated. Fig. 6 illustrates another connection of the prior art, again illustrating how the purpose of the meter may be defeated. Fig. 7 illustrates the connections of the meter of my invention, showing how the interruption of the neutral conductor will not modify the function of the meter.

Like parts are indicated by similar characters of reference throughout the different figures.

The system illustrated being a direct-current system, the meter is a commutated meter, having one field-coil 1 in circuit with an outside main 2 and another field-coil 3 in circuit with an outside main 4, while the commutator-brush 5, engaging the upper commutator 6, is connected with the main 4, and a companion commutator-brush 7 is connected with the neutral conductor 8, the commutator-brush 9 engaging the lower commutator 10 being also connected with the neutral conductor 8, while the companion commutator-brush 11 is connected with the upper main 2. The commutators 6 and 10 are connected with windings 12 and 13 that are subdivided into armature-coils that are connected with the commutator-segments in a manner well understood to those skilled in the art. These armature-coils of both windings are preferably mounted upon the same bobbin and are interposed between the commutators. The armature-windings are mounted upon the meter-shaft 14 and are disposed between the coils 1 and 3. Each armature-winding preferably has a starting-coil in circuit therewith as well as a resistance to cut down the current flowing through the armature-circuit. Such a coil 15 and resistance 16 is shown in circuit with the winding 12, and such a coil 17 and resistance 18 is shown in circuit with the winding 13. The foregoing specific description applies generally to all of the apparatus except that illustrated in Figs. 5 and 6, which latter show, as has been specified, arrangements of the prior art.

Referring more particularly to Figs. 3 to 7, inclusive, fuses 19, 20, and 21 are included in the two outside main conductors and the neutral conductor, respectively. Hitherto dishonest consumers have opened one or the other of these fuses, enabling them to secure the services of one side of this system without compensation, as the meter would fail to register. By subdividing the pressure-winding of the meter in the manner that has been specified, so that one portion of the winding will be connected in one side of the system and the other portion of the winding in the other side of the system, such an intention is defeated, for then, practically speaking, the meter is transformed from a three-wire meter to a double meter. Nor can the object of my invention be defeated by opening the neutral conductor on both sides of its connection with the pressure-windings, as indicated in Fig. 7, for then the system is transformed into the Brush system of distribution, whereof the lamps or other consuming means 22 operate between both sides of the system, the combined pressure-winding of the meter being subject to the pressure between the outside mains 2 and 4, causing the said meter proper to operate, notwithstanding the separation of the neutral conductor. Thus, no matter what may be the manipulation or interruption of the main conductors or the neutral conductor one-half of the pressure-winding is either subject to the pressure between the neutral and an outside main conductor or the entire pressure-winding is subject to the pressure between the outside mains. Thus, if the system is one wherein a pressure of two hundred and twenty volts obtains between two outside main conductors, each half of the pressure-winding when properly in circuit will be subject to a pressure of one hundred and ten volts, and the entire pressure-winding when the neutral conductor is removed from circuit, as indicated in Fig. 7, will be subject to a pressure of two hundred and twenty volts. The energy is therefore always properly recorded when current is being supplied, whether fuses are intentionally or unintentionally excluded from circuit.

I do not wish to be limited to the precise details of my invention herein shown, as changes may readily be made without departing from the spirit of the invention; but,

Having thus described my invention, I claim as new, and desire to secure by Letters Patent, the following:

1. A three-wire system of distribution having two main conductors and a neutral conductor between the main conductors, whereby the system is divided into two sides, and having a wattmeter in circuit therewith whose pressure-winding is subdivided into two portions, each connected with the neutral conductor of the system, each side of the system including one of said portions, substantially as described.

2. A three-wire system of distribution having two main conductors and a neutral conductor between the main conductors, whereby the system is divided into two sides, and having a wattmeter in circuit therewith whose pressure-winding is subdivided into two portions, each connected with the neutral conductor of the system, each side of the system including one of said portions, each main of the system including a field-winding of the wattmeter coacting with the field produced by the pressure-winding in effecting the operation of the meter, substantially as described.

3. A three-wire system of distribution having a wattmeter in circuit therewith whose pressure-winding is subdivided into two portions, each side of the system including one of said portions, each subdivision of the pressure-winding being subdivided into armature-coils, commutator-segments connected with the armature-coils, and commutator-brushes engaging the commutator-segments, to include the corresponding pressure-winding portion in circuit, substantially as described.

4. A three-wire system of distribution having a wattmeter in circuit therewith whose pressure-winding is subdivided into two portions, each side of the system including one of said portions, each main of the system including a field-winding of the wattmeter coacting with the field produced by the pressure-winding in effecting the operation of the meter, each subdivision of the pressure-winding being subdivided into armature-coils, commutator-segments connected with the armature-coils, and commutator-brushes engaging the commutator-segments, to include the corresponding pressure-winding portion in circuit, substantially as described.

5. A three-wire system of distribution having a wattmeter in circuit therewith whose pressure-winding is subdivided into two portions, each side of the system including one of said portions, each subdivision of the pressure-winding being subdivided into armature-coils, commutator-segments connected with the armature-coils, and commutator-brushes engaging the commutator-segments, to include the corresponding pressure-winding portion in circuit, the portions of the pressure-winding being mounted adjacent to each other and interposed between the aforesaid field-windings, substantially as described.

6. A three-wire system of distribution having a wattmeter in circuit therewith whose pressure-winding is subdivided into two portions, each side of the system including one of said portions, each main of the system including a field-winding of the wattmeter coacting with the field produced by the pressure-winding in effecting the operation of the meter, each subdivision of the pressure-winding being subdivided into armature-coils, commutator-segments connected with the armature-coils, and commutator-brushes engaging the commutator-segments, to include the corresponding pressure-winding portion in circuit, the portions of the pressure-winding being mounted adjacent to each other and interposed between the aforesaid field-windings, substantially as described.

7. A three-wire system, having two main conductors and a neutral conductor between the main conductors, whereby the system is divided into two sides of distribution, a wattmeter in circuit therewith whose pressure-winding is subdivided into two portions, each connected with the neutral conductor of the system, each side of the system including one of said portions, each subdivision of the pressure-winding being subdivided into armature-coils, commutator-segments connected with the armature-coils, and commutator-brushes engaging the commutator-segments, to include the corresponding pressure-winding portion in circuit, substantially as described.

8. A three-wire system having two main conductors and a neutral conductor between the main conductors, whereby the system is divided into two sides of distribution, a wattmeter in circuit therewith whose pressure-winding is subdivided into two portions, each connected with the neutral conductor of the system, each side of the system including one of said portions, each main of the system including a field-winding of the wattmeter coacting with the field produced by the pressure-winding in effecting the operation of the meter, each subdivision of the pressure-winding being subdivided into armature-coils, commutator-segments connected with the armature-coils, and commutator-brushes engaging the commutator-segments, to include the corresponding pressure-winding portion in circuit, substantially as described.

9. A three-wire system having two main conductors and a neutral conductor between the main conductors, whereby the system is divided into two sides of distribution, a wattmeter in circuit therewith whose pressure-winding is subdivided into two portions, each connected with the neutral conductor of the system, each side of the system including one of said portions, each subdivision of the pressure-winding being subdivided into armature-coils, commutator-segments connected with the armature-coils, and commutator-brushes engaging the commutator-segments, to include the corresponding pressure-winding portion in circuit, the portions of the pressure-winding being mounted adjacent to each other and interposed between the aforesaid field-windings, substantially as described.

10. A three-wire system having two main conductors and a neutral conductor between the main conductors, whereby the system is divided into two sides of distribution a wattmeter in circuit therewith whose pressure-winding is subdivided into two portions, each connected with the neutral conductor of the system, each side of the system including one of said portions, each main of the system including a field-winding of the wattmeter coacting with the field produced by the pressure-winding in effecting the operation of the meter, each subdivision of the pressure-winding being subdivided into armature-coils, commutator-segments connected with the armature-coils, and commutator-brushes engaging the commutator-segments, to include the corresponding pressure-winding portion in circuit, the portions of the pressure-winding being mounted adjacent to each other and interposed between the aforesaid field-windings, substantially as described.

In witness whereof I hereunto subscribe my name this 6th day of October, A. D. 1904.

THOMAS DUNCAN.

Witnesses:
    JOHN E. DALTON,
    JOHN R. PFRAMMER.